United States Patent Office 2,720,933
Patented Oct. 18, 1955

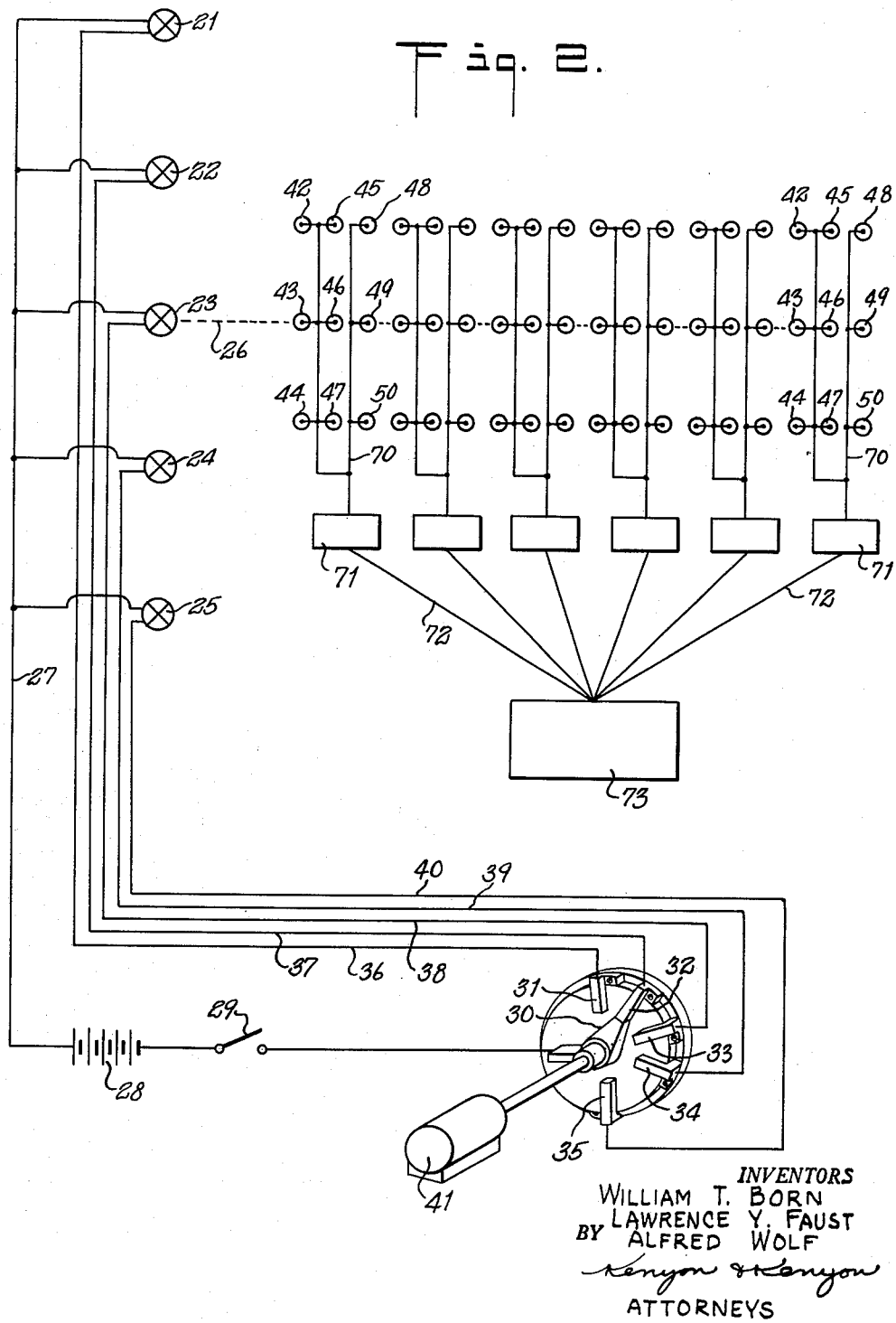

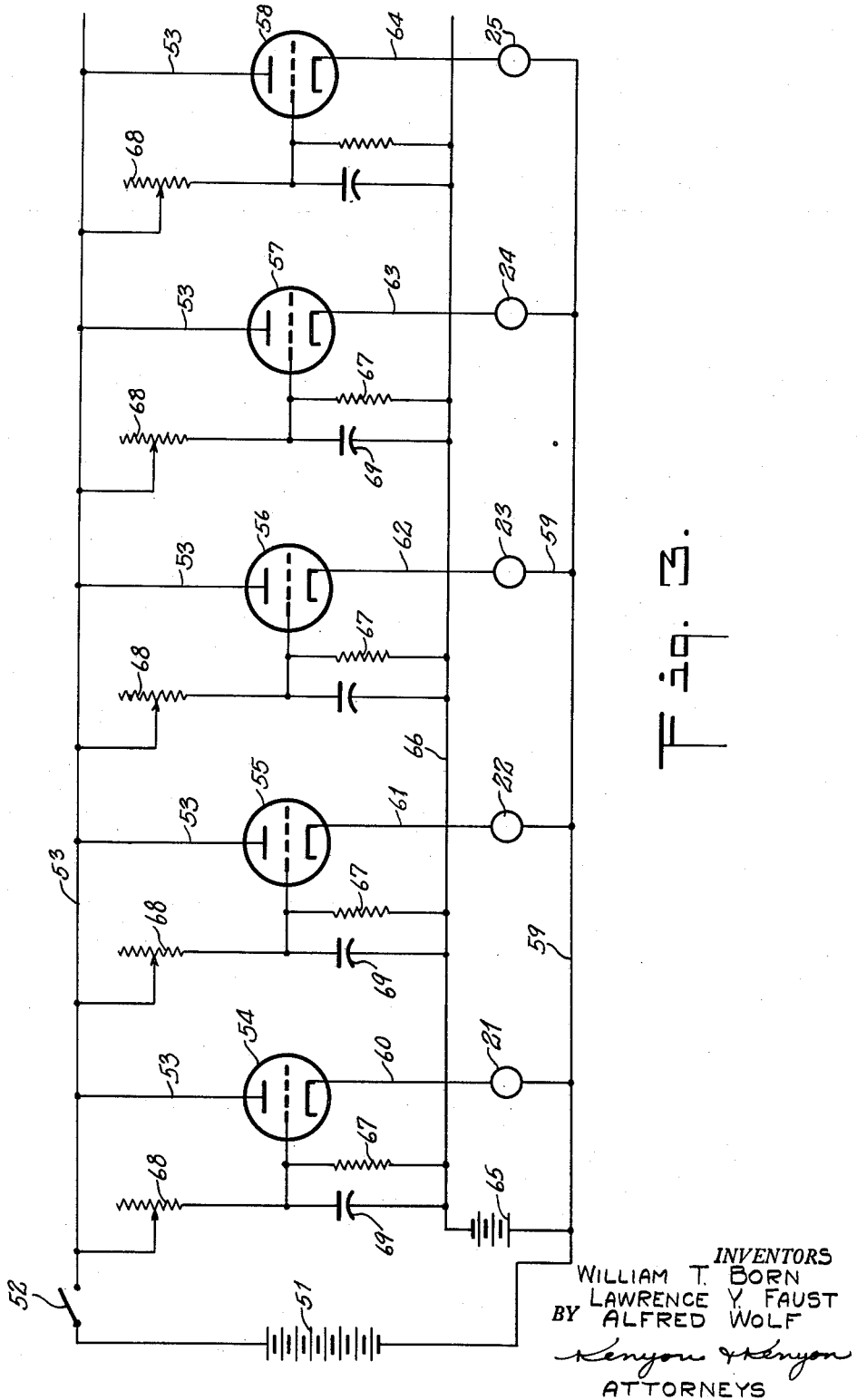

2,720,933
SEISMIC GEOPHYSICAL EXPLORATION

William T. Born, Lawrence Y. Faust, and Alfred Wolf, Tulsa, Okla., assignors to Geophysical Research Corporation, New York, N. Y., a corporation of New Jersey Application December 4, 1952, Serial No. 324,084

4 Claims. (Cl. 181—.5)

This invention relates to geophysical exploration, particularly by the seismic reflection method.

One object is to obtain improved records in areas where the prior art reflection method practices result in records which are very poor or useless. Another object is to obtain such improved records by using more effectively than heretofore the principle that improvement results when unwanted seismic vibrations arrive at the area of detection in a random manner and out of phase with each other, with the desired seismic reflections, from the subterranean bed or beds under exploration, arriving at this area sufficiently together and in phase to reinforce each other.

The accompanying drawings are entirely schematic because of the nature of the invention, the various figures being as follows:

Fig. 2 is a bird's-eye view of apparatus suitable for practicing the present invention;

Fig. 3 is a circuit diagram showing a modification of an element of Fig. 2.

Figure 1:
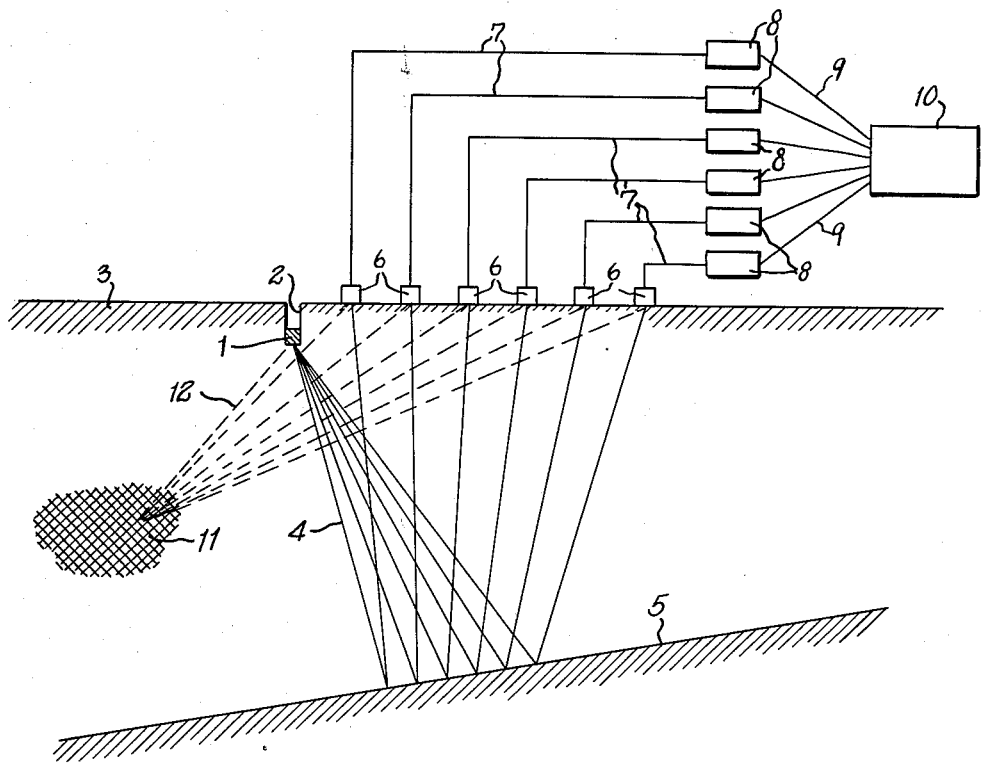
Fig. 1 is a vertical section taken through the earth, illustrating a prior art reflection method in action and providing an explanation of why this method sometimes results in poor or useless records.

Referring first to Fig. 1, in this illustration of a conventional reflection method a dynamite charge 1 is fired in a bore hole 2 formed in the earth 3, and the seismic waves or vibration, resulting from the seismic impulse applied to the earth by the shock of the dynamite explosion, travel in what is best visualized as rays 4 to the subterranean bed 5 which reflects them to a plurality of geophones 6. These geophones are interspaced along the line of the seismic profile to be developed, and are each connected by a multiple cable 7 to an amplifier 8 having its output connected through a suitable multiple conductor line 9 to the usual recorder 10. This recorder contains a galvanometer for each of the various geophones and these galvanometers are designed to make curves on a travelling strip of paper so as to produce the record. In some instances the resulting records are clear and can be interpreted satisfactorily in connection with the calculations leading to the development of the seismic profile.

It is to be understood that it is customary in the field to repeatedly operate along a predetermined vertical plane of the earth to obtain data on the depth and dip of the bed in that direction. This data is plotted on a paper strip to produce a profile of the subterranean strata in the plane explored. The intersection of such a plane with the surface of the earth is referred to herein as the seismic profile line or by similar wording.

In many instances the described type of prior art practice results in poor or useless records, presumably because instead of the earth being homogeneous throughout the area affected by the seismic vibrations, there are inhomogeneities such as the near surface rock formation 11 shown in Fig. 1. In such an instance the seismic vibrations from the exploded shot 1 are reflected by the undesired reflecter 11 to the various geophones 6, as is indicated by the broken lines 12. When there are many such inhomogeneities the undesired reflections mask those from the bed 5 on the record so that its interpretation becomes extremely difficult or impossible.

The above description necessarily is based on theory but it is generally considered to be accurate. Many areas, especially in parts of West Texas and New Mexico, do not produce satisfactory records when practicing the prior art type of reflection method. In such areas the method of the present invention ordinarily produces satisfactory records.

Referring now to Fig. 2, in accordance with the present invention a plurality of laterally interspaced shot points 21, 22, 23, 24 and 25 are used. These may be bore holes each loaded with a dynamite charge provided with an electric blasting cap, although any way for applying adequate seismic impulses to the earth may be used. These shot points are shown arranged in a straight line at right angles to the desired profile line, indicated by the broken line 26, the shot points intersecting this profile line and being uniformly distributed on either side of the same. Preferably the dynamite charges are positioned in the bore holes at equal elevation with reference to sea level regardless of the elevation of the earth's surface at the top of the holes. If the charges are not at equal elevations their firing times must involve appropriate corrections, so as to give the effect of the charges all being fired at the same level.

One terminal of each electric blasting cap is connected with a common conductor 27 going to one pole of a detonating battery 28. The other pole of this battery connects through a switch 29 with a rotary contactor 30 provided with interspaced contacts 31, 32, 33, 34 and 35, one for each of the blasting caps at the shot points 21 through 25. The contacts connect with their respective caps through conductors 36 through 40 respectively. The rotary contactor 30 may be turned in either direction and at different speeds by a variable speed reversing motor 41. With this arrangement charges at the various shot points may be set off sequentially in either order of direction respecting the line of points, and the timing between the shots of each sequence may be varied. If desired the contacts may be adjustably positioned to provide a means for correcting for different elevations of the shot points. A direct switching arrangement may be used to fire all of the shots simultaneously, this not being illustrated because its arrangement is so obvious to those skilled in this art.

A feature of the invention is that the shot points are spaced laterally apart for a total distance at least equal to and preferably several times greater than the average wave length of seismic vibration beneath the earth's surface formations. This arrangement best serves to eliminate or reduce the seismic waves or vibrations reflected from or scattered by inhomogeneities, as exemplified by the rock 11 in Fig. 1. The greater the total spacing of the shot-points, the better will be the elimination of scattered waves; the spacing is subject only to the limitation that reflected waves must arrive close together in time at any of the geophones in the reflection setup. In the actual testing of the present invention the total or maximum spacing, which is the distance between the shot points 21 and 25, was made about 1200 feet, which is equal to about four seismic wave lengths. This made the spacing between any two adjacent shot points equal to approximately one wave length.

If all of the shots are fired simultaneously the distances between any one geophone or detector used and the images of all of the shot points in the reflecting bed must differ by less than a quarter wave length of the seismic vibration that is recorded, if the desired reflected vibrations are to arrive at the geophone area sufficiently together and in phase to reinforce each other. By arranging the line of shot points at right angles to the line of seismic profile, it is easier to comply with this requirement and still to provide the described total spacing between the shot points. In other words, it makes it easier to make the total shot point spacing, meaning the maximum distance between any two shot points, at least equal to the average wave length of the seismic vibrations in the earth beneath the earth's surface formation, and, if desired, of the order of several wave lengths, without interfering with the arrival of the desired vibration reflections sufficiently together and in phase to mutually reinforce each other.

With the described transverse shot point line arrangement, firing of the various charges simultaneously provides improved reflection records, providing the shots are all at the same elevation and providing the reflecting bed has no material dip transverse to the profile line and, therefore, more or less in line with the line of shot points. However, when the reflecting bed has an appreciable dip in the general direction of the line of shot points, simultaneous shot firing cannot meet the condition required for reinforcement of the reflected vibrations and at the same time permit the described shot point spacing.

In such instances of transverse dip the sequence firing equipment, previously described and shown by Fig. 2, may be used to fire the shots sequentially so that the seismic impulses they apply to the earth are so related to each other, as to timing and order, as to cause the seismic vibrations reflected from these shots by the bed to arrive at the predetermined geophone or detector area of the earth sufficiently together in time and phase to reinforce each other. Simultaneous firing may be considered to be such timing in the case of a subterranean bed that is substantially level transversely to the seismic profile line, or, in other words, more or less in line with the line of shot points.

Usually, the dip of the subterranean bed is unknown and, therefore, it is impossible to predetermine the timing and order of the shot sequence. The present invention embraces the shooting of a plurality of such sequences of shots at each reflection setup. These sequences embrace different timings and orders of the detonations of the shots, which are predetermined as causing seismic vibrations reflected from the shots by the bed to arrive at the predetermined geophone or detector area with the reflected vibrations sufficiently together as to time and phase to reinforce each other in the case of different amounts and directions of transverse dip of the reflecting bed. This area is of course intersected by the profile line so that data on depth and dip in the direction of the profile line may be obtained.

The use of a geophone or detector at the above areas, or, normally, a line of geophones extending along the profile line, may be used to pick up the reflected vibrations reinforced by each other and with the undesired reflections, from laterally scattered inhomogeneities, largely canceled by mutual interference with each other. These results are obtained only when the shot points are spaced apart a total distance at least equal to the wave length of the seismic vibration in the earth beneath the surface formations, and, in addition, the distances between each geophone and the images of the plurality of shot points in the bed under exploration do not vary respecting each other by more than one quarter wave length of the seismic vibration, or proper firing timing sequences are used to compensate for differences in these distances. Normally, only one of the shooting sequences will produce these desired results.

The geophones may be connected through the usual amplifiers to the usual recorder. An individual record is made for each of the shooting sequences so that a plurality of records result. It should now be apparent that one of these records will be better than the balance because it represents the shooting sequence where the timing and order of the shots most closely coincides with that required to produce the above effect in the case of the actual transverse dip of the subterranean bed under exploration. This is the record that is selected for use in connection with developing the data necessary for use in plotting the profile.

The relation between the time delay between the shots of a sequence, and the transverse dip of the subterranean bed, may be predetermined by the use of the following formula:

$$t = (a/V) \cdot \sin 2d$$

where:

$a$ = spacing between the two shot points.
$V$ = velocity of seismic waves.
$d$ = dip angle in the direction from one shot point to the other.

The method may be used with a single geophone connected to the input of any of the amplifiers, but it is considered preferable to connect the output of several detectors of earth vibrations to a single amplifier; the above detectors are placed at a plurality of locations within a small area close to the line of the seismic profile. As shown by Fig. 2, an area coverage setup may be used for each of the channels feeding the recorder. As shown by Fig. 2 nine geophones are used for each channel, and these geophones are arranged as three mutually parallel lines of geophones in each instance, and these lines are positioned transverse to the profile line 26. Thus, geophones 42, 43 and 44 form one line, the second line comprises geophones 45, 46 and 47, and the third line running the series up to geophone 50. The geophones of each line are spaced apart for a total distance at least equal to the described seismic wave length because this further contributes to a clearer record. The total spacing referred to is the distance between the geophone 42 and geophone 44, for example. The geophones of the other channels are similar and need not be referred to specifically.

Limits on the dimensions of the area covered by the geophones of any one channel are imposed by the finite value of the angle of incidence of the reflected seismic rays on the surface of the earth, and because it is desirable that the projection of the maximum dimension of the geophone area in any direction on the emerging reflected seismic wave ray be less than about a one quarter wave length of the seismic vibration recorded. Generally these requirements limit the dimensions to about 200 feet in the direction of the seismic profile line. Transversely to this line the dimension is limited mainly by the transverse dip of the subterranean bed under exploration.

As a practical example, in testing the present invention the total shot point spacing, between the shot points 21 and 25, was 1200 feet, which is about four times the average seismic vibration wave length, this making the spacing between adjacent shot points equal to about one wave length in distance. These tests were conducted in areas of gently dipping strata and it was found possible to use area coverages of 600 feet transversely, between the geophones 42 and 44, with a 200 foot spacing between the geophones 43 and 49, a rectangular area having been outlined by the geophones of each channel as is shown in Fig. 2. In practical operations the distance between geophones 42 and 44 may range from 300 to 600 feet, and the distance between geophones 43 and 49 may range from 100 to 200 feet.

In these tests three sequences of shots were fired, in each instance including one sequence when the shots were fired simultaneously and two other sequences when the shots were fired in opposite orders or sequence directions with a time delay between the successive shots of 0.003 sec. This provided three records from which the best was selected for computation.

The equipment shown in Fig. 2 for firing the shots in sequence is intended mainly to provide a quickly grasped understanding of the operation involved. In testing the invention the shots were fired by the apparatus illustrated by Fig. 3.

Referring now to Fig. 3, a B battery 51 has its positive pole connected through a switch 52 and conductor 53 with the plates of a plurality of gas filled thyratrons 54 through 58. There is one thyratron for each of the electric blasting caps of the various shots 21 through 25. The negative pole of the battery 51 connects through a conductor 59 with one terminal of all of the caps and the other terminal of each cap connects with the cathode of its own thyratron through conductors 60 through 64. The grids of the various thyratrons are biased negatively beyond the point of plate current cut-off by a C battery 65 having its positive pole connected with the conductor 59 and its negative pole connected with the various grids by way of the conductors 66 and grid resistors 67.

The grid of each thyratron is connected also with the positive conductor 53 through variable resisters 68, and the various grid resisters are in each instance shunted by a capacitor 69.

To operate this apparatus shown by Fig. 3 the switch 52 is closed. The various shots fire at times determined by the values of the adjustable resisters 68 and the grid capacitors 69. By adjusting the resisters 68 individually the timing between the shots may be individually adjusted within wide limits, or all of the shots may be fired simultaneously. As a practical example of values, the grid resisters 67 may each have a value of about one megohm, the grid capacitors 69 may each have a capacity of about .1 microfarad and the time control resisters 68 may each be variable between zero and one megohm.

It is believed that the shot point arrangements and geophone spreads that have been described may be varied considerably in connection with the practice of the present invention. It is to be understood that, generally speaking, the accepted principles will be followed in constructing the various items of apparatus that have been described. For example, it is to be assumed that the various amplifiers include suitable filtering arrangements so as to record only the seismic vibrations having the wave length of seismic vibrations in the earth beneath the earth's surface layer. Where the plurality of geophones are connected to one channel the geophones will be so connected in phase as to cause that channel to record the sum of the vibrations detected by the various geophones of that channel. A suitable arrangement should be made for recording the shot point instant, and the record should include the usual indication of the passage of time. All these will be accomplished if the amplifier and recorder are of a standard construction designed for seismic work.

As shown in Fig. 2, for each channel each of the geophones 42 through 50 are interconnected in series and in phase by a multi-conductor cable 70 that connects with the input of the usual amplifier 71. The output from this amplifier is fed through a multi-conductor line 72 to one of the galvanometers of the usual recorder 73 which, of course, produces the record of each shooting sequence.

We claim:

1. A seismic geophysical exploration method including applying seismic impulses to the earth at a plurality of points positioned above a subterranean bed and spaced laterally apart for a total distance at least equal to the average wave length of seismic vibration beneath the earth's surface formations and arranged in a line transverse to and intersecting the desired seismic profile line, said bed having an unknown dip transverse to said profile line, said impulses being applied to said points as a plurality of sequences respectively embracing different timing and order of the application of the impulses at their respective points, each sequence being predetermined as causing seismic vibrations from said impulses reflected by said bed to arrive at a selected area of the earth on said profile line sufficiently together as to time and phase to reinforce each other for a selected amount and direction of dip of said bed, the selected amount and direction of dip being different for each sequence, and recording separately the seismic vibrations arriving at said area from each of said sequences to produce a plurality of records, whereby to include the record obtained from the one of said sequences having the timing and order most closely coinciding with that required by the actual amount and direction of said unknown dip for said reflected vibrations to reinforce each other at said area.

2. A seismic geophysical exploration method including applying seismic impulses to the earth at a plurality of points positioned above a subterranean bed and spaced laterally apart for a total distance at least equal to the average wave length of seismic vibration beneath the earth's surface formations and arranged in a line transverse to and intersecting the desired seismic profile line, said bed having an unknown dip transverse to said profile line, said impulses being applied to said points as a plurality of sequences respectively embracing different timing and order of the application of the impulses at their respective points, each sequence being predetermined as causing seismic vibrations from said impulses reflected by said bed to arrive at a selected area of the earth on said profile line sufficiently together as to time and phase to reinforce each other for a selected amount and direction of dip of said bed, the selected amount and direction of dip being different for each sequence, and recording separately the sums of the seismic vibrations arriving at a plurality of interspaced locations within said area from each of said sequences to produce a plurality of records, whereby to include the record obtained from the one of said sequences having the timing and order most closely coinciding with that required by the actual amount and direction of said unknown dip for said reflected vibrations to reinforce each other at said area.

3. A seismic geophysical exploration method including applying seismic impulses to the earth at a plurality of points positioned above a subterranean bed and spaced laterally apart for a total distance at least equal to the average wave length of seismic vibration beneath the earth's surface formations and arranged in a line transverse to and intersecting the desired seismic profile line, said bed having an unknown dip transverse to said profile line, said impulses being applied to said points as a plurality of sequences respectively embracing different timing and order of the application of the impulses at their respective points, each sequence being predetermined as causing seismic vibrations from said impulses reflected by said bed to arrive at a selected area of the earth on said profile line sufficiently together as to time and phase to reinforce each other for a selected amount and direction of dip of said bed, the selected amount and direction of dip being different for each sequence, and recording separately the sums of the seismic vibrations arriving at a plurality of interspaced locations within said area from each of said sequences to produce a plurality of records, whereby to include the record obtained from the one of said sequences having the timing and order most closely coinciding with that required by the actual amount and direction of said unknown dip for said reflected vibrations to reinforce each other at said area, said locations being arranged in a line transverse to said profile line.

4. A seismic geophysical exploration method including applying seismic impulses to the earth at a plurality of points positioned above a subterranean bed and spaced laterally apart for a total distance at least equal to the average wave length of seismic vibration beneath the earth's surface formations and arranged in a line transverse to and intersecting the desired seismic profile line, said bed having an unknown dip transverse to said profile line, said impulses being applied to said points as a plurality of sequences respectively embracing different timing and order of the application of the impulses at their respective points, each sequence being predetermined as causing seismic vibrations from said impulses reflected by said bed to arrive at a selected area of the earth on said profile line sufficiently together as to time and phase to reinforce each other for a selected amount and direction of dip of said bed, the selected amount and direction of dip being different for each sequence, and recording separately the sums of the seismic vibrations arriving at a plurality of interspaced locations within said area from each of said sequences to produce a plurality of records, whereby to include the record obtained from the one of said sequences having the timing and order most closely coinciding with that required by the actual amount and direction of said unknown dip for said reflected vibrations to reinforce each other at said area, said locations being arranged in a line transverse to said profile line and being spaced apart for a total distance at least equal to said wave length.

References Cited in the file of this patent

UNITED STATES PATENTS

| | | |
|---|---|---|
| 2,329,721 | Hoover et al. | Sept. 21, 1943 |
| 2,449,921 | Wolf | Sept. 21, 1948 |
| 2,580,636 | Wolf | Jan. 1, 1952 |
| 2,586,731 | Simon et al. | Feb. 19, 1952 |